US011927837B2

(12) United States Patent
Melakari et al.

(10) Patent No.: US 11,927,837 B2
(45) Date of Patent: Mar. 12, 2024

(54) ACTIVELY ADAPTIVE OPTICAL ELEMENTS AND APPARATUSES

(71) Applicant: Pixieray Oy, Espoo (FI)

(72) Inventors: Klaus Melakari, Espoo (FI); Rebecca Qing Melakari, Espoo (FI)

(73) Assignee: Pixieray Oy, Espoo (FI)

( * ) Notice: Subject to any disclaimer, the term of this patent is extended or adjusted under 35 U.S.C. 154(b) by 0 days.

(21) Appl. No.: 17/669,980

(22) Filed: Feb. 11, 2022

(65) Prior Publication Data

US 2023/0258959 A1 Aug. 17, 2023

(51) Int. Cl.
*G02C 7/08* (2006.01)
*G02B 27/00* (2006.01)
*G02F 1/29* (2006.01)

(52) U.S. Cl.
CPC ......... *G02C 7/083* (2013.01); *G02B 27/0093* (2013.01); *G02F 1/294* (2021.01)

(58) Field of Classification Search
CPC ...... G02B 27/0093; G02C 7/083; G02F 1/294
See application file for complete search history.

(56) References Cited

U.S. PATENT DOCUMENTS

| | | | | |
|---|---|---|---|---|
| 11,567,326 | B1 * | 1/2023 | Jamali | G02F 1/134309 |
| 2014/0085726 | A1 | 3/2014 | Portney | |
| 2014/0092327 | A1 * | 4/2014 | Machida | G02C 7/083 349/13 |
| 2017/0123233 | A1 * | 5/2017 | Sabovic | A61B 3/08 |

FOREIGN PATENT DOCUMENTS

| | | | |
|---|---|---|---|
| EP | 2645137 A1 | 10/2013 | |
| WO | 03090611 A1 | 11/2003 | |
| WO | WO-2018052989 A1 * | 3/2018 | ............... A61F 2/16 |
| WO | 2020245680 A1 | 12/2020 | |

OTHER PUBLICATIONS

European Patent Office, Notification of Transmittal of the International Seach Report and the Written Opinion of the International Searching Authority, or the Declaration, International Application No. PCT/FI2022/050752, dated Mar. 6, 2023, 16 pages.

* cited by examiner

*Primary Examiner* — Jessica M Merlin
(74) *Attorney, Agent, or Firm* — Ziegler IP Law Group

(57) ABSTRACT

An optical apparatus includes eye-tracking means, an active optical element per eye including an active material, and means for controlling the active material to generate optical powers. Gaze directions of a user's eyes are determined. When it is detected, based on the gaze directions, that the user is looking through a predefined portion of the active optical element, a drive signal is generated to drive said means to control the active material to produce a predefined optical power. When it is detected that the user's gaze is moving towards a periphery of the predefined portion, at least one other drive signal is generated to drive said means to control the active material to produce at least one intermediate optical power lying in a range between a zero optical power and the predefined optical power.

24 Claims, 5 Drawing Sheets

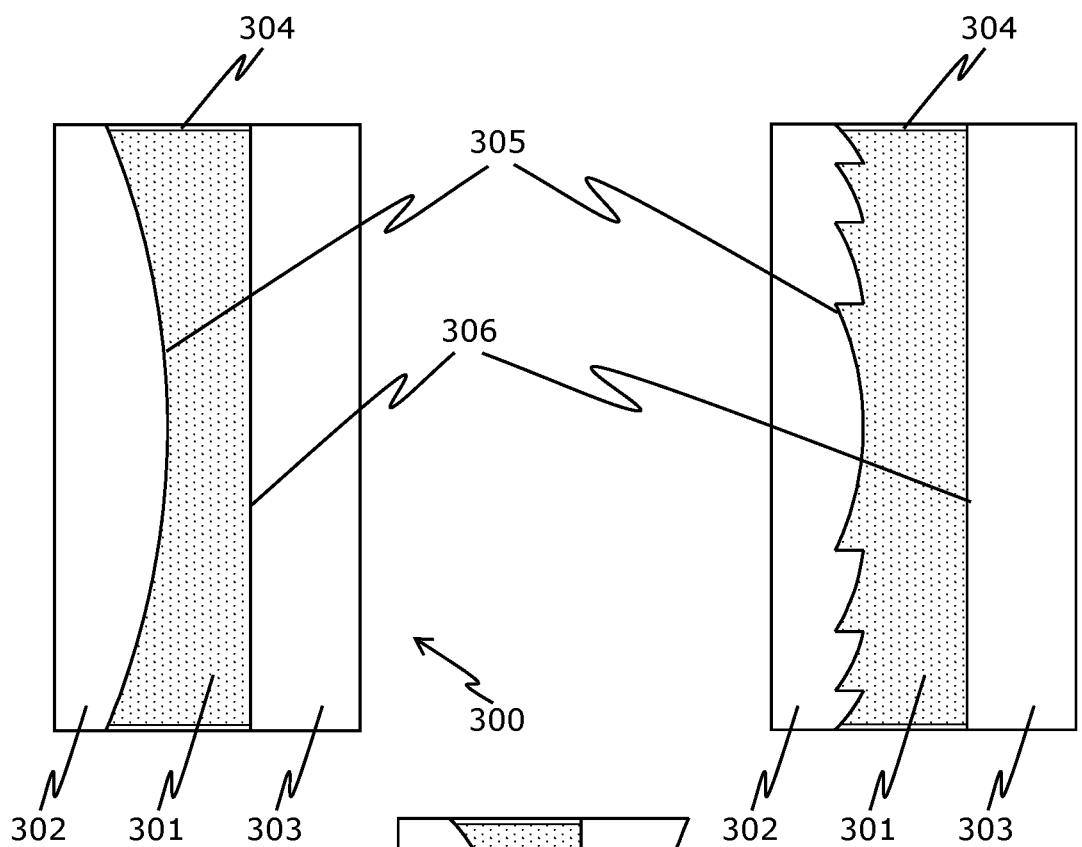
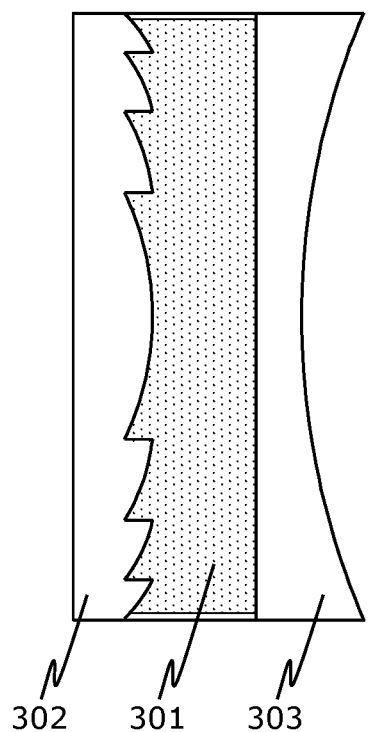
FIG. 3A
FIG. 3B
FIG. 3C

ACTIVELY ADAPTIVE OPTICAL ELEMENTS AND APPARATUSES

TECHNICAL FIELD

The present disclosure relates to optical apparatuses that are actively adaptive. Moreover, the present disclosure relates to methods for manufacturing such optical apparatuses.

BACKGROUND

Combining reading glasses and corrective prescription lenses (for distance vision) together is not a trivial optical challenge. One conventional optical apparatus incorporates bi-focal lenses, which have two separate optical surfaces for reading and distance vision that are not blend together. An abrupt change in optical power across a boundary between these separate optical surfaces causes various distortions and double images.

Another conventional optical apparatus incorporates progressive lenses, which have a distance vision area, a reading area and a narrow corridor area progressively transitioning between the distance vision area and the reading area. A major problem with a progressive lenses is that a large area of the lens is wasted in transitioning, whilst providing a distorted view and poor vision to a user.

Yet another conventional optical apparatus incorporates a combination of an electrically-controllable reading lens and a distance vision lens, wherein the electrically-controllable reading lens is much smaller than the distance vision lens, and is located at a fixed portion of the distance vision lens, similar to bi-focal lenses. Such conventional techniques also suffer from similar challenges as in bi-focal lenses.

Therefore, in light of the foregoing discussion, there exists a need to overcome the aforementioned challenges associated with conventional optical apparatuses.

SUMMARY

The present disclosure seeks to provide an improved optical apparatus. Moreover, the present disclosure seeks to provide a method for manufacturing an optical apparatus. Furthermore, the present disclosure also seeks to provide a solution to the existing problems of conventional optical apparatuses.

In a first aspect, an embodiment of the present disclosure provides an optical apparatus comprising:
  eye-tracking means;
  an active optical element per eye, comprising an active material encased between at least a first substrate and a second substrate, the first substrate and the second substrate being optically transparent;
  means for controlling the active material in the active optical element to generate a plurality of optical powers; and
  a processor configured to:
    process eye-tracking data, collected by the eye-tracking means, to determine gaze directions of a user's eyes;
    detect whether or not the user is looking through a predefined portion of the active optical element, based on a gaze direction of a given eye in front of which said active optical element is worn;
    when it is detected that the user is looking through the predefined portion of the active optical element, generate a drive signal to drive said means to control the active material in the active optical element to produce a predefined optical power;
    detect when the user's gaze is moving towards a periphery of the predefined portion of the active optical element, based on a change in the gaze direction of the given eye; and
    when it is detected that the user's gaze is moving towards the periphery of the predefined portion of the active optical element, generate at least one other drive signal to drive said means to control the active material in the active optical element to produce at least one intermediate optical power, the at least one intermediate optical power lying in a range between a zero optical power and the predefined optical power.

In a second aspect, an embodiment of the present disclosure provides a method for manufacturing an optical apparatus, the method comprising:
  employing an active optical element formed by encasing an active material between at least a first substrate and a second substrate, the first substrate and the second substrate being optically transparent;
  employing means for controlling the active material in the active optical element to generate a plurality of optical powers;
  employing eye-tracking means; and
  configuring a processor to:
    process eye-tracking data, collected by the eye-tracking means, to determine gaze directions of a user's eyes;
    detect whether or not the user is looking through a predefined portion of the active optical element, based on a gaze direction of a given eye in front of which said active optical element is worn;
    when it is detected that the user is looking through the predefined portion of the active optical element, generate a drive signal to drive said means to control the active material in the active optical element to produce a predefined optical power;
    detect when the user's gaze is moving towards a periphery of the predefined portion of the active optical element, based on a change in the gaze direction of the given eye; and
    when it is detected that the user's gaze is moving towards the periphery of the predefined portion of the active optical element, generate at least one other drive signal to drive said means to control the active material in the active optical element to produce at least one intermediate optical power, the at least one intermediate optical power lying in a range between a zero optical power and the predefined optical power.

Embodiments of the present disclosure substantially eliminate, or at least partially address the aforementioned problems in the prior art, allow for different optical powers to be produced in an entirety of the active optical element based on which portion of the active optical element is being used by the user, and facilitate a smooth transition in the optical power produced by the active optical element.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 3A-3C are cross-sectional views of an optical apparatus, in accordance with various embodiments of the present disclosure;

Figure 1:
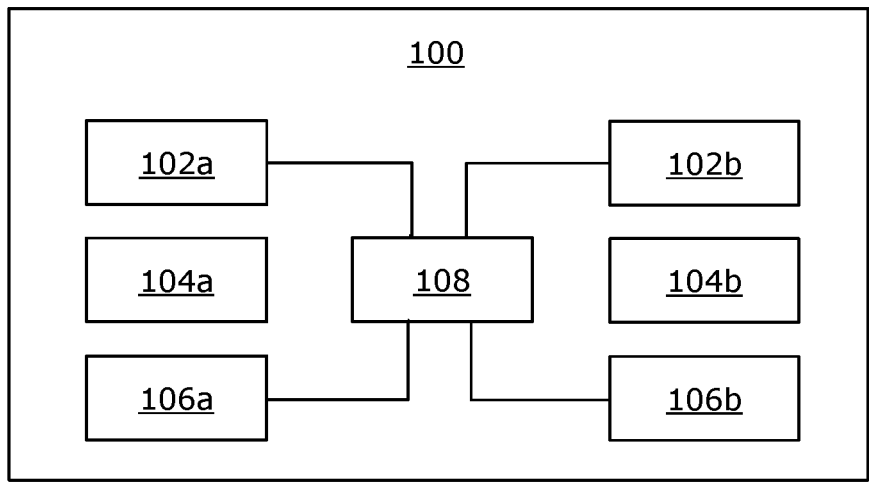
FIG. 1 is a schematic diagram of an optical apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify an item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides an optical apparatus comprising:

eye-tracking means;
an active optical element per eye, comprising an active material encased between at least a first substrate and a second substrate, the first substrate and the second substrate being optically transparent;
means for controlling the active material in the active optical element to generate a plurality of optical powers; and
a processor configured to:
process eye-tracking data, collected by the eye-tracking means, to determine gaze directions of a user's eyes;
detect whether or not the user is looking through a predefined portion of the active optical element, based on a gaze direction of a given eye in front of which said active optical element is worn;
when it is detected that the user is looking through the predefined portion of the active optical element, generate a drive signal to drive said means to control the active material in the active optical element to produce a predefined optical power;
detect when the user's gaze is moving towards a periphery of the predefined portion of the active optical element, based on a change in the gaze direction of the given eye; and
when it is detected that the user's gaze is moving towards the periphery of the predefined portion of the active optical element, generate at least one other drive signal to drive said means to control the active material in the active optical element to produce at least one intermediate optical power, the at least one intermediate optical power lying in a range between a zero optical power and the predefined optical power.

In a second aspect, an embodiment of the present disclosure provides a method for manufacturing an optical apparatus, the method comprising:

employing an active optical element formed by encasing an active material between at least a first substrate and a second substrate, the first substrate and the second substrate being optically transparent;
employing means for controlling the active material in the active optical element to generate a plurality of optical powers;
employing eye-tracking means; and
configuring a processor to:
process eye-tracking data, collected by the eye-tracking means, to determine gaze directions of a user's eyes;
detect whether or not the user is looking through a predefined portion of the active optical element, based on a gaze direction of a given eye in front of which said active optical element is worn;
when it is detected that the user is looking through the predefined portion of the active optical element, generate a drive signal to drive said means to control the active material in the active optical element to produce a predefined optical power;
detect when the user's gaze is moving towards a periphery of the predefined portion of the active optical element, based on a change in the gaze direction of the given eye; and
when it is detected that the user's gaze is moving towards the periphery of the predefined portion of the active optical element, generate at least one other drive signal to drive said means to control the active material in the active optical element to produce at least one intermediate optical power, the at least one intermediate optical power lying in a range between a zero optical power and the predefined optical power.

Pursuant to embodiments, different optical powers are produced in the optical apparatus based on which portion of the active optical element is being used by the user (namely, a portion through which the user is looking). The optical power of an entirety of the active optical element is adjusted according to the portion of the active optical element being used. When the user is looking through the predefined portion, the entirety of the active optical element produces the predefined optical power. When the user's gaze is moving towards the periphery of the predefined portion, the entirety of the active optical element produces the at least one intermediate optical power, thereby facilitating a smooth transition in the optical power produced by the active optical element. The smooth transition is beneficially facilitated gradually in a temporal manner, which makes the transition less noticeable. This reduces distortions, prismatic errors and cylindrical errors, as there are no separate portions having different optical powers. In this manner, the optical power of the optical apparatus is actively tuned, based on the portion of the active optical element being used, thereby facilitating vergence accommodation, whilst enabling the user to focus on objects at a wide range of distances in a reproducible manner.

As a same optical power is produced in the entirety of the active optical element (wherein the optical power depends on the portion of the active optical element being used), the user is provided with a full coverage area for reading and seeing nearby objects clearly. Producing the same optical power at a given time point also eliminates distortions that are seen in conventional multifocal lenses in which separate portions of the multifocal lenses produce separate optical powers at the same time.

Throughout the present disclosure, the term "optical apparatus" refers to an apparatus that is to be worn over eyes of the user. Examples of such an optical apparatus include, but are not limited to, a pair of glasses, a pair of sunglasses, smart glasses, and a head-mounted display.

It will be appreciated that the processor is at least communicably coupled to the eye-tracking means and the means for controlling. The processor could be implemented as any one of: a microprocessor, a microcontroller, or a controller. As an example, the processor could be implemented as an application-specific integrated circuit (AISC) chip or a reduced instruction set computer (RISC) chip.

Throughout the present disclosure, the term "active optical element" refers to an optical element whose optical power can be changed. In this regard, the aforesaid means is employed to control the active material in the active optical element to generate different optical powers at different time points in an entirety of the active optical element based on which portion of the active optical element is being used by the user. Said means may, for example, be electrical, piezoelectric, magnetic, mechanical, or a combination thereof, as will be described in more detail later.

Throughout the present disclosure, the term "predefined portion" refers to a portion of the active optical element that is meant for use during reading or focussing on nearby objects. The predefined portion of the active optical element could be located based on a specific purpose for which the user needs the optical apparatus. The user may need the optical apparatus for a specific occupational use. As an example, an electrician or an automotive technician may need an optical apparatus in which the predefined portion is located at a top part of the active optical element. As another example, a pilot may need an optical apparatus in which the predefined portion is located at a bottom part as well as a top part of the active optical element, as she/he needs to see controls that are provided in an instrument panel as well as an overhead panel of a cockpit.

Apart from the specific purpose for which the user needs the optical apparatus, the predefined portion of the active optical element could also be located specific to the user. In other words, the predefined portion could be located based on a location of a pupillary centre of the given eye of the user. Optionally, in this regard, the processor is configured to:
 select a portion of the active optical element whose centre overlaps with the pupillary centre of the given eye of the user; and identify the selected portion as the predefined portion of the active optical element.

The technical effect of this feature is that it allows the optical apparatus to be personalised and customised for the user, thereby providing a highly comfortable and convenient view to the user. As the predefined portion is not a fixed portion, the same optical apparatus can be customised for different users. This makes the optical apparatus highly reusable.

The predefined portion of the active optical element could be shaped as a simple closed curve. Herein, the term "simple closed curve" refers to a connected curve that does not cross itself and ends at the same point where it begins. Hexagons, octagons, circles and ellipses are some examples of simple closed curves. Despite the name "curve", a simple closed curve does not actually have to be curved. Some simple closed curves are made of line segments only, and are known as polygons, while some simple closed curves are made by curved lines only. Other simple closed curves are made of both line segments and curved lines.

Moreover, optionally, the processor is configured to:
 process the gaze-tracking data to determine a velocity and/or acceleration with which the user's gaze is moving; and
 generate the at least one other drive signal to drive said means to control the active material in the active optical element to produce the at least one intermediate optical power, based on the velocity and/or acceleration with which the user's gaze is moving.

This allows the processor to control a speed of transition in the optical power. This also allows the processor to control a manner in which the at least one intermediate optical power is produced. As an example, when the velocity and/or acceleration does not exceed a predefined threshold, the at least one intermediate optical power may include at most three intermediate optical powers; when the velocity and/or acceleration exceeds the predefined threshold, the at least one intermediate optical power may include more than three intermediate optical powers. In this way, the number of intermediate optical powers in the at least one intermediate optical powers can be varied according to the velocity and/or acceleration with which the user's gaze is moving.

Furthermore, optionally, the optical apparatus further comprises pose-tracking means, wherein the processor is configured to:
 process pose-tracking data, collected by the pose-tracking means, to determine a velocity and/or acceleration with which the user is moving; and
 generate the at least one other drive signal to drive said means to control the active material in the active optical element to produce the at least one intermediate optical power, based on the velocity and/or acceleration with which the user is moving.

This also allows the processor to control the speed of transition in the optical power and/or a manner in which the at least one intermediate optical power is produced. As an example, the speed of transition and/or the manner in which the at least one intermediate optical power is produced may be different in a case when the user is walking while reading, as compared to another case when the user is sitting while reading.

Hereinabove, the term "pose-tracking means" refers to specialized equipment that is employed to detect and/or follow changes in a pose of the user. The term "pose" encompasses both position and orientation. The pose-tracking means could be implemented as at least one of: an optics-based tracking system (which utilizes, for example, infrared cameras, visible-light cameras, and the like), an accelerometer, a gyroscope, an Inertial Measurement Unit (IMU), a Timing and Inertial Measurement Unit (TIMU), a Global Positioning System (GPS) tracking system. The pose-tracking data may be in a form of images, IMU/TIMU values, accelerometer data, gyroscope data, or similar.

Regarding the phrase "when the user's gaze is moving towards the periphery of the predefined portion", it will be appreciated that the user's gaze could move in any direction (namely, vertical, horizontal or oblique). As an example, the user's gaze could move up and down. As another example, the user's gaze could move up or down obliquely towards left or right. As yet another example, the user's gaze could move sideways. However, in such a case, the user may still be reading when her/his gaze moves sideways. Therefore, when the user's gaze is moving sideways, the at least one intermediate optical power is optionally produced, only when the user's gaze is about to cross the periphery of the predefined portion. Optionally, in this regard, when the user's gaze is moving sideways, the at least one intermediate optical power is optionally produced, when the user's gaze is predicted to cross the periphery within a predefined time period. The user's gaze can be predicted to cross the periphery within the predefined time period, based on the velocity and/or acceleration with which the user's gaze is moving.

Throughout the present disclosure, the term "predefined optical power" refers to a positive optical power for use during reading or focussing on nearby objects. This may, for example, be needed when the user has presbyopia. The predefined optical power may be as prescribed for the user's eye, or may be selected to conform with the user's need. As an example, the predefined optical power could be selected to based on the reading power prescribed for the user.

Optionally, the processor is configured to:
determine a given optical depth at which the user is looking, based on at least one of: the gaze directions of the user's eyes, depth information of a real-world scene currently being seen by the user; and
select, from amongst a plurality of predefined optical powers, the predefined optical power for the given eye of the user, based on the given optical depth at which the user is gazing.

As a result, different optical powers can be produced for different optical depths, even when the user is looking at nearby objects. The plurality of predefined optical powers can be discrete optical powers, for example, such as 0.75 dioptre, 1 dioptre, 1.5 dioptre, 2 dioptre and so on. As an example, the user may need 1 dioptre at an optical depth of 1 metre, 2 dioptre at an optical depth of 0.5 metre, and so on. etc.

Throughout the present disclosure, the term "eye-tracking means" refers to specialized equipment that is employed to detect and/or follow a direction of the user's gaze. Such eye tracking is performed when the optical apparatus, in operation, is worn by the user. Optionally, the eye-tracking means is implemented by way of contact lenses having sensors, cameras monitoring features of the user's eye, and the like. Such features may comprise at least one of: a shape of a pupil of the user's eye, a size of the pupil, corneal reflections of at least one light source from a surface of the user's eye, a relative position of the pupil with respect to the corneal reflections, a relative position of the pupil with respect to corners of the user's eye. Such eye-tracking means are well-known in the art.

Optionally, the given optical depth at which the user is looking is determined based on a convergence of the gaze directions of the user's eyes. In this regard, the given optical depth can be determined, based on an inter-pupillary distance of the user, by using triangulation. Additionally or alternatively, the given optical depth can be determined based on the depth information and the given gaze direction of the given eye of the user. In this regard, the depth information can be collected using at least one of: a depth camera, a time-of-flight (ToF) camera, an ultrasound imaging sensor, a radar, a light detection and ranging (Lidar) sensor.

Moreover, optionally, the processor is configured to:
detect when the user's gaze is outside the periphery of the predefined portion of the active optical element; and
when it is detected that the user's gaze is outside the periphery of the predefined portion of the active optical element, generate another drive signal to drive said means to control the active material in the active optical element to produce a base optical power.

The base optical power may be a zero optical power or a negative optical power, depending on the user's need. As an example, when the user has presbyopia only and is looking through a remaining portion of the active optical element (namely, outside the predefined portion), zero optical power is produced to enable the user to see faraway objects clearly. As another example, when the user has both presbyopia and myopia and is looking through the remaining portion of the active optical element, a negative optical power is produced to facilitate distance viewing. In these examples, the optical power (whether negative or zero optical power), which is to be produced when the user is looking though the remaining portion of the active optical element, allows the user to see faraway objects clearly. This optical power is often required to be used more frequently than the positive optical power (namely, the predefined optical power) during a typical day, and is hereinafter referred to as "base optical power".

Furthermore, the at least one intermediate optical power comprises one intermediate optical power in some implementations, and a plurality of intermediate optical powers in other implementations. Pursuant to embodiments, the plurality of intermediate optical powers are produced in a descending order or an ascending order, depending on whether the transition is being made from the predefined optical power to the base optical power, or from the base optical power to the predefined optical power. Producing the plurality of intermediate optical powers in the descending order or the ascending order ensures that the optical power varies in a continuous and gradual manner. As a result, the transition is less noticeable to the user.

Throughout the present disclosure, the term "active material" refers to a material that is controlled to produce a particular optical power at a particular time point. The particular optical power depends on the portion of the active optical element that is being used by the user. By "controlling the active material" in the active optical element, it is meant that at least one of the following can be controlled in the active optical element: a curvature of a meniscus of the active material, a refractive index of the active material, an amount of the active material.

Optionally, in this regard, the aforesaid means is employed to control at least one of: the curvature of the meniscus, the refractive index, the amount of the active material. In some implementations, a given optical power is produced by controlling the curvature of the meniscus of the active material. In other implementations, the given optical power is produced by creating a relative refractive index between the active material and the substrates (namely, the first substrate and the second substrate). In yet other implementations, the given optical power is produced by removing the active material and replacing the active material with air, thereby creating a relative refractive index between the air and the substrates (namely, the first substrate and the second substrate). In all these implementations, a given drive signal for driving said means is generated based on the given optical power that is to be produced. Throughout the present disclosure, the term "given optical power" encompasses the predefined optical power and the at least one intermediate optical power, and optionally, the base optical power.

Furthermore, in an embodiment, said means (for controlling the active material) comprises:
- at least one first electrode deposited on the first substrate and disposed between the first substrate and the active material; and
- at least one second electrode deposited on the second substrate and disposed between the second substrate and the active material, wherein the at least one first electrode and the at least one second electrode are optically transparent.

Optionally, the at least one first electrode is deposited as a transparent electrode layer on the first substrate. In such a case, the electrode layer covers an entirety of a surface of the first substrate, such that the electrode layer is disposed between said surface of the first substrate and the active material. Alternatively, optionally, the at least one first electrode comprises a plurality of first electrodes that are deposited as a non-continuous, transparent electrode layer comprising separate, unconnected segments of said electrode layer on the first substrate.

Optionally, the at least one second electrode is deposited as a transparent electrode layer on the second substrate. Alternatively, optionally, the at least one second electrode comprises a plurality of second electrodes that are deposited as a non-continuous, transparent electrode layer comprising separate, unconnected segments of said electrode layer on the second substrate. The plurality of second electrodes may be beneficially aligned with respective ones of the plurality of first electrodes.

Such electrode layers may, for example, be made of indium tin oxide (ITO) or doped zinc oxide (ZnO), where ZnO is doped with aluminium or hydrogen. Alternatively, such electrode layers may be made of a conductive polymer or graphene.

Moreover, the optical apparatus comprises a power source to supply electrical power to the processor as well as the aforesaid electrodes. The power source and the processor may be installed at any suitable location on the optical apparatus. As an example, when the optical apparatus is implemented as a pair of glasses, the power source and the processor may be installed at a frame of said pair of glasses. The power source and/or the processor can be located at a bridge or an end of a temple of the frame.

In order to produce a given optical power, the active material in the active optical element is controlled by generating a potential difference between the at least one first electrode and the at least one second electrode. In some implementations, when zero potential difference is generated (namely, by applying a same voltage to both the at least one first electrode and the at least one second electrode), the active optical element is in an 'OFF' mode in which the active optical element produces the base optical power, which may be a negative optical power or a zero optical power depending on the user's need. In such implementations, the active optical element is in an 'ON' mode in which the given optical power is produced, when a given potential difference is generated between the at least one first electrode and the at least one second electrode depending on the given optical power that is to be produced. In this regard, the at least one first electrode and the at least one second electrode can be supplied varying voltages to allow different amounts of the potential difference to be generated therebetween.

For illustration purposes only, there will now be described different implementations of the optical apparatus. In some of these implementations, said means (for controlling the active material) is electrical; in other implementations, said means is piezoelectric, magnetic, mechanical or a combination thereof.

In a first implementation, the active material comprises an electrically-conducting liquid and an electrically-insulating liquid, wherein when controlling the active material, the curvature of the meniscus of the active material in the active optical element is controlled to produce the given optical power. In this case, the meniscus is a liquid-liquid interface between the electrically-conducting liquid and the electrically-insulating liquid. The electrically-conducting liquid and the electrically-insulating liquid have different refractive indices; therefore, a particular curvature of the meniscus produces the given optical power.

The first implementation works on the principle of electro-wetting, wherein the curvature of the meniscus of the active material changes with a change in the potential difference. Thus, the given optical power is produced based on an amount of potential difference that is generated between the at least one first electrode and the at least one second electrode. Moreover, in the first implementation, one of the at least one first electrode and the at least one second electrode is in contact with the active material, while another of the at least one first electrode and the at least one second electrode is insulated from the active material by an insulating layer formed thereon.

In a second implementation, the active material is a liquid crystal material, wherein when controlling the active material, an alignment of liquid crystal molecules of the liquid crystal material is controlled to adjust a refractive index of the liquid crystal material in the active optical element, thereby producing the given optical power. The alignment of the liquid crystal molecules in the active optical element changes with a change in the potential difference generated between the at least one first electrode and the at least one second electrode.

Optionally, the active optical element comprises a first dielectric layer disposed between the first substrate and the at least one first electrode, and a second dielectric layer disposed between the second substrate and the at least one second electrode. The first dielectric layer and the second dielectric layer may, for example, be made of silicon oxide ($SiO_x$). Moreover, optionally, the active optical element further comprises a sealing contour of a polymer material that seals the liquid crystal material between the first substrate and the second substrate. The sealing contour not only keeps the liquid crystal material inside, but also protects the liquid crystal material from air (mainly, oxygen) and dust (ambient atmosphere), and thus, ensures a reliable operation of the active optical element.

The second implementation includes three different sub-implementations, namely a sub-implementation 'A' that works on the principle of refractive index matching, a sub-implementation 'B' that works on the principle of liquid crystal Fresnel lenses, and a sub-implementation 'C' that works on the principle of diffractive Fresnel lens.

Some examples of the sub-implementation 'A' have been illustrated in conjunction with FIGS. 3A-3C. In the sub-implementation 'A' of the second implementation, at least one of the first substrate, the second substrate is implemented as a Fresnel lens having concentric grooves, wherein the concentric grooves face the liquid crystal material encased between the first substrate and the second substrate. The at least one of the first substrate, the second substrate that is implemented as a Fresnel lens is hereinafter referred to as the "Fresnel substrate", for the sake of convenience only. The shape of the concentric grooves can be refractive or diffractive.

In the sub-implementation 'A', the concentric grooves of the Fresnel substrate can be formed to emulate characteristics of a planoconvex lens whose curvature corresponds to the predefined optical power, namely the positive optical power for the user's presbyopia. When the refractive index of the liquid crystal material is adjusted to match a refractive index of the Fresnel substrate, an interface between the liquid crystal material and the concentric grooves of the Fresnel substrate disappears. As a result, the active optical element produces the base optical power, which may be a negative optical power or a zero optical power depending on the user's need. When the refractive index of the liquid crystal material in the active optical element is adjusted to be different from (optionally, to be lower than) the refractive index of the Fresnel substrate, the interface between the liquid crystal material and the concentric grooves of the Fresnel substrate re-appears and the predefined optical power is produced. The refractive index of the liquid crystal material in the active optical element is beneficially adjusted to lie between the refractive index at which the predefined optical power is produced and the refractive index of the Fresnel substrate, so as to produce the at least one intermediate optical power. This facilitates a smooth transition when switching from the predefined optical power to the base optical power as well as when switching from the base optical power to the predefined optical power.

The technical benefit of employing the Fresnel substrate in the sub-implementation 'A' is that it allows the active optical element to operate with a thin layer of the liquid crystal material. Thinner the layer of the liquid crystal material, lower is the amount of potential difference that is required to adjust the refractive index of the liquid crystal material. Thus, electrical power requirements of the active optical element are reduced greatly.

In the sub-implementation 'B' of the second implementation, the active optical element is implemented as a liquid crystal Fresnel lens. The liquid crystal Fresnel lens has concentric zones, which are formed entirely by adjusting the refractive index of the liquid crystal material in said concentric zones by applying different voltages in corresponding second electrodes. In other words, these concentric zones are not physical grooves, and are formed by applying the different voltages to the liquid crystal material itself. The refractive index of the liquid crystal material in said concentric zones is adjusted to produce the given optical power (which could be any one of: the predefined optical power, the at least one intermediate optical power, the base optical power). An example of such a liquid crystal Fresnel lens has been illustrated in conjunction with FIG. 4.

In a case where the base optical power is a negative optical power, the concentric zones of the liquid crystal Fresnel lens can be formed to emulate characteristics of a planoconcave lens whose curvature corresponds to the base optical power, when the user's gaze is outside the periphery of the predefined portion. Likewise, the concentric zones of the liquid crystal Fresnel lens can be formed to emulate characteristics of a planoconvex lens whose curvature corresponds to the predefined optical power (namely, the positive optical power), when the user is looking through the predefined portion. Likewise, when the user's gaze is moving towards the periphery of the predefined portion, the refractive index of the liquid crystal material in the concentric zones is adjusted to produce the at least one intermediate optical power.

It will be appreciated that in order to be able to form said concentric zones, the plurality of first electrodes and/or the plurality of second electrodes are optionally arranged in a form of a spiral phyllotactic pattern. Such a spiral phyllotactic pattern is similar to how sunflower seeds are arranged in a sunflower. One example of such a spiral phyllotactic pattern has been illustrated in conjunction with FIG. 5. The technical benefit of arranging the plurality of first electrodes and/or the plurality of second electrodes in the form of a spiral phyllotactic pattern is that the number and thicknesses of said concentric zones can be modified on the fly.

In this way, different optical powers can be produced in the active optical element depending on an arrangement and shapes of the plurality of second electrodes and voltages applied to the plurality of first electrodes and/or the plurality of second electrodes.

In the sub-implementation 'C' of the second implementation, the active optical element comprises a matrix of diffractive zones whose refractive index can be varied. In a given diffractive zone, the refractive index of the liquid crystal material adjusted to cause a phase retardation of an incident light beam. In order to operate the active optical element as a diffractive Fresnel lens, the liquid crystal material in the diffractive zones is controlled to produce differently delayed light wavefronts.

Optionally, in the sub-implementation 'C', the active optical element comprises at least one other substrate, namely in addition to the first substrate and the second substrate. In such a case, a separate layer of the liquid crystal material is encased between the second substrate and the at least one other substrate. Moreover, at least one pair of electrodes is also deposited on the second substrate and the at least one other substrate. The at least one pair of electrodes can be implemented in a manner that is similar to how the at least one first electrode and the at least one second electrode are implemented. The technical benefit of having multiple layers of the liquid crystal material whose refractive index can be adjusted using corresponding electrodes is that they enable the active optical element to function as a multiphase spatial light modulator (SLM).

In this way, the active optical element can be implemented as any one of: a liquid crystal Fresnel lens, a diffractive Fresnel lens.

Furthermore, in a third implementation, the active material is a fluid whose refractive index matches a refractive index of at least one of: the first substrate, the second substrate, and wherein when controlling the active material, an amount of the fluid in the active optical element is varied, thereby producing the given optical power. The third implementation works on the principle of refractive index matching.

In the third implementation, the active optical element comprises at least one other substrate, namely in addition to the first substrate and the second substrate. In such a case, a separate layer of the fluid is encased between the second substrate and the at least one other substrate. The second substrate could be implemented as a planoconvex lens whose convex surface faces the fluid encased between the first substrate and the second substrate, and whose curvature corresponds to a first positive optical power, while the at least one other substrate could be implemented as at least one other planoconvex lens whose convex surface faces the fluid encased between the second substrate and the at least one other substrate, and whose curvature corresponds to a second positive optical power. Alternatively, the second substrate and the at least one other substrate could be implemented as Fresnel lenses having concentric grooves, wherein the concentric grooves face the fluid. In such a case, the concentric grooves of the Fresnel substrates are formed to emulate characteristics of respective ones of the aforesaid planoconvex lenses.

Having separate layers of the fluid between pairs of adjacent substrates enables the optical power to be changed in steps. When the fluid is filled between the pairs of adjacent substrates, an interface between the fluid and the substrates disappears, because the refractive index of the fluid matches the refractive index of at least one of the adjacent substrates. As a result, the active optical element produces the base optical power, which may be a negative optical power or a zero optical power depending on the user's need. When the fluid is removed from between at least one of the pairs of the adjacent substrates, air replaces the removed fluid. As a refractive index of air is lower than the refractive index of the fluid, the interface between air and the at least one of the adjacent substrates re-appears, thereby producing a given optical power. As an example, the refractive index of the fluid and the refractive index of the at least one other substrate and the at least one of: the first substrate, the second substrate could be 1.4, whereas the refractive index of air is 1. This allows for a relative refractive index of 0.4.

As an example, if the active optical element comprises two pairs of adjacent substrates, wherein one of the two pairs of adjacent substrates can produce 1.5 dioptre and another of the two pairs of adjacent substrates can produce 0.75 dioptre, the optical powers can be changed in steps of 0 dioptre, 0.75 dioptre, 1.5 dioptre and 2.25 dioptre. It will be appreciated that there can be two or more pairs of such adjacent substrates.

In the third implementation, the means (for controlling the active material) is employed to vary the amount of the fluid. Optionally, said means comprises capillaries that are to be employed to remove the fluid by capillary action in at least one fluid channel, which connects the active optical element with at least one fluid reservoir.

Optionally, said means comprises valves that are employed to control corresponding capillaries. The valves may be mechanical valves, which could be controlled by actuators. These actuators may, for example, be implemented as electromagnetic actuators, piezoelectric actuators, memory metal actuators, electro-active polymers, electrophoresis actuators or similar. Alternatively, optionally, said means employs another technique for surface energy control in the at least one fluid channel using electricity.

It will be appreciated that the refractive index of the first substrate can be same as or different from the refractive index of the second substrate. The base optical power that is to be produced by the active optical element depends on the curvature of surfaces of the first substrate and/or the second substrate. Moreover, the first substrate and/or the second substrate can be made of any one of: glass, a polycarbonate, a plastic, a high-index plastic. A person skilled in the art will recognize many variations, alternatives, and modifications of embodiments of the present disclosure.

Moreover, in an embodiment, the optical apparatus further comprises a passive optical element per eye, arranged on an optical path of the active optical element, the passive optical element having a fixed optical power, wherein the fixed optical power of the passive optical element is combined with a given optical power produced by the active optical element to produce a combined optical power. Herein, the combined optical power refers to a sum of the fixed optical power and the given optical power. Optionally, a centre of the passive optical element is aligned with the pupillary centre of the given eye of the user.

Throughout the present disclosure, the term "passive optical element" refers to an optical element whose optical power cannot be changed. In other words, the optical power of the passive optical element is fixed. In some implementations, the fixed optical power corresponds to an optical power prescribed for distance vision of the given eye of the user. It will be appreciated that the predefined optical power is a positive optical power, whereas the fixed optical power is any one of: a negative optical power, a zero optical power.

The passive optical element can be employed in at least some of the aforementioned implementations, for example, such as the first implementation (that is based on the principle of electro-wetting), the sub-implementation 'A' of the second implementation (that is based on the principle of refractive index matching), the sub-implementation 'C' of the second implementation (that is based on the principle of diffractive Fresnel lens), and the third implementation (that is based on the principle of refractive index matching). Optionally, the passive optical element is implemented as any one of: the first substrate, the second substrate.

In some implementations, when the active optical element is switched 'OFF', the active optical element produces no optical power. In such implementations, the combined optical power (that is produced by the combination of the fixed optical power and the given optical power) can be employed to produce the base optical power. As an example, a surface of one of the first substrate and the second substrate through which light would exit towards the user's eye, during operation of the optical apparatus, could be made planoconcave, such that a curvature of said surface corresponds to the base optical power. As mentioned earlier, the base optical power can be a negative optical power or a zero optical power depending on the user's need. Thus, the passive optical element can be beneficially employed to compensate for the condition of myopia in the user. However, in a case where the user only requires reading power, the passive optical element may have zero optical power.

In other implementations, the passive optical element can be implemented as a Fresnel lens having concentric zones, for example, such as the aforementioned Fresnel substrate. In such a case, the combined optical power is employed to produce the positive optical power for the user's presbyopia.

The present disclosure also relates to the method of the second aspect as described above. Various embodiments and variants disclosed above, with respect to the aforementioned first aspect, apply mutatis mutandis to the method.

Optionally, the method further comprises configuring the processor to:
   determine a given optical depth at which the user is looking, based on at least one of: the gaze directions of the user's eyes, depth information of a real-world scene currently being seen by the user; and
   select, from amongst a plurality of predefined optical powers, the predefined optical power for the given eye of the user, based on the given optical depth at which the user is gazing.

Optionally, the method further comprises configuring the processor to:
- select a portion of the active optical element whose centre overlaps with a pupillary centre of the given eye of the user; and
- identify the selected portion as the predefined portion of the active optical element.

Moreover, optionally, the method further comprises configuring the processor to:
- process the gaze-tracking data to determine a velocity and/or acceleration with which the user's gaze is moving; and
- generate the at least one other drive signal to drive said means to control the active material in the active optical element to produce the at least one intermediate optical power, based on the velocity and/or acceleration with which the user's gaze is moving.

Furthermore, optionally, the method further comprises:
employing pose-tracking means; and
configuring the processor to:
- process pose-tracking data, collected by the pose-tracking means, to determine a velocity and/or acceleration with which the user is moving; and
- generate the at least one other drive signal to drive said means to control the active material in the active optical element to produce the at least one intermediate optical power, based on the velocity and/or acceleration with which the user is moving.

Moreover, optionally, the method further comprises employing a passive optical element per eye, arranged on an optical path of the active optical element, the passive optical element having a fixed optical power, wherein the fixed optical power of the passive optical element is combined with a given optical power produced by the active optical element to produce a combined optical power. Optionally, the passive optical element is implemented as any one of: the first substrate, the second substrate.

Optionally, in the method, said means is employed to control at least one of: a curvature of a meniscus, a refractive index, an amount of the active material.

Furthermore, optionally, the active optical element is formed by:
- depositing at least one first electrode on the first substrate; and
- depositing at least one second electrode on the second substrate, wherein the at least one first electrode is disposed between the first substrate and the active material, and the at least one second electrode is disposed between the second substrate and the active material, wherein the at least one first electrode and the at least one second electrode are optically transparent.

In a first implementation, the active material comprises an electrically-conducting liquid and an electrically-insulating liquid, wherein when controlling the active material, a curvature of a meniscus of the active material in the active optical element is controlled to produce a given optical power, the meniscus being a liquid-liquid interface between the electrically-conducting liquid and the electrically-insulating liquid.

In a second implementation, the active material is a liquid crystal material, wherein when controlling the active material, an alignment of liquid crystal molecules of the liquid crystal material is controlled to adjust a refractive index of the liquid crystal material in the active optical element, thereby producing the given optical power.

In a third implementation, the active material is a fluid whose refractive index matches a refractive index of at least one of: the first substrate, the second substrate, and wherein when controlling the active material, an amount of the fluid in the active optical element is varied, thereby producing the given optical power.

DETAILED DESCRIPTION OF THE DRAWINGS

FIG. 1 is a schematic diagram of an optical apparatus 100, according to an embodiment of the present disclosure. The optical apparatus 100 comprises eye-tracking means, depicted as eye-tracking means 102a and 102b for a first eye and a second eye, respectively; an active optical element per eye, depicted as an active optical elements 104a and 104b for the first eye and the second eye, respectively; means for controlling an active material in the active optical element, depicted as means 106a and 106b for the first eye and the second eye, respectively; and a processor 108. The processor 108 is configured to perform operations as per the aforementioned first aspect.

Figure 2:
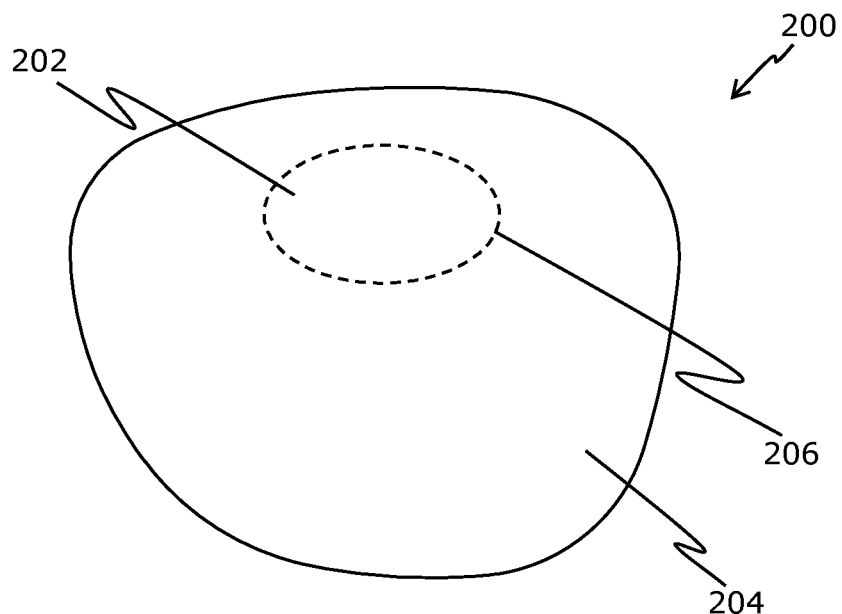
FIG. 2 is a schematic diagram of an active optical element, in accordance with an embodiment of the present disclosure.

FIG. 2 is a schematic diagram of an active optical element 200, in accordance with an embodiment of the present disclosure. The active optical element 200 has a predefined portion 202 and a remaining portion 204. When it is detected that a user is looking through the predefined portion 202, a predefined optical power is produced in an entirety of the active optical element 200. When it is detected that the user's gaze is moving towards a periphery 206 of the predefined portion 202, at least one intermediate optical power is produced in the entirety of the active optical element 200. When it is detected that the user is looking through the remaining portion 204, a base optical power is produced in the entirety of the active optical element 200.

FIG. 2 is merely an example, which should not unduly limit the scope of the claims herein. It is to be understood that the specific implementation of the active optical element 200 is provided as an example and is not to be construed as limiting it to specific shape, size or location of the predefined portion 202 as well as to specific shapes or sizes of the active optical element 200. A person skilled in the art will recognize many variations, alternatives, and modifications of embodiments of the present disclosure. In FIG. 2, the predefined portion 202 has been shown with dotted lines to indicate that it is not marked physically on the active optical element 200.

Referring next to FIGS. 3A-3C, illustrated are cross-sectional views of an optical apparatus 300, in accordance with various embodiments of the present disclosure. The optical apparatus 300 comprises an active optical element that comprises an active material 301 encased between a first substrate 302 and a second substrate 303. The active optical element optionally comprises a sealing contour 304. At least one first electrode 305 is disposed between the active material 301 and the first substrate 302, and at least one second electrode 306 is disposed between the active material 301 and the second substrate 303.

As shown in FIG. 3A, the first substrate 302 could be implemented as a planoconvex lens whose convex surface faces the active material 301, and whose curvature corresponds to a predefined optical power, namely a positive optical power for a user's presbyopia. Alternatively, as shown in FIGS. 3B-3C, the first substrate 302 could be implemented as a Fresnel lens having concentric grooves, wherein the concentric grooves face the active material 301. In such a case, the concentric grooves of the Fresnel substrate are formed to emulate characteristics of the aforesaid planoconvex lens.

Optionally, the optical apparatus 300 further comprises a passive optical element having a fixed optical power. The passive optical element can be implemented as any one of: the first substrate 301, the second substrate 303. With reference to FIG. 3C, the second substrate 303 functions as a passive optical element, and is implemented as a plano-concave lens whose curvature corresponds to a base optical power, which is a negative optical power.

In an implementation that works on the principle of refractive index matching and where the active material 301 is a liquid crystal material, a refractive index of the liquid crystal material can be adjusted to produce a given optical power. When the refractive index of the liquid crystal material matches a refractive index of the first substrate 302, an interface between the active material 301 and the first substrate 302 disappears. As a result, the optical apparatus 300 produces the base optical power.

In another implementation that works on the principle of refractive index matching and where the active material 301 is a fluid whose refractive index matches the refractive index of the first substrate 302, the optical apparatus 300 produces the base optical power when the fluid is filled inside the active optical element. When the fluid is removed and replaced with air, the interface between the air and the first substrate 302 re-appears, thereby producing the given optical power.

FIGS. 3A-3C are merely examples, which should not unduly limit the scope of the claims herein. It is to be understood that the specific implementations of the optical apparatus 300 are provided as examples and are not to be construed as limiting it to specific arrangements of the first substrate, the second substrate, the at least one first electrode and the plurality of second electrodes, or to specific curvatures of the first substrate and the second substrate. A person skilled in the art will recognize many variations, alternatives, and modifications of embodiments of the present disclosure.

Figure 4:
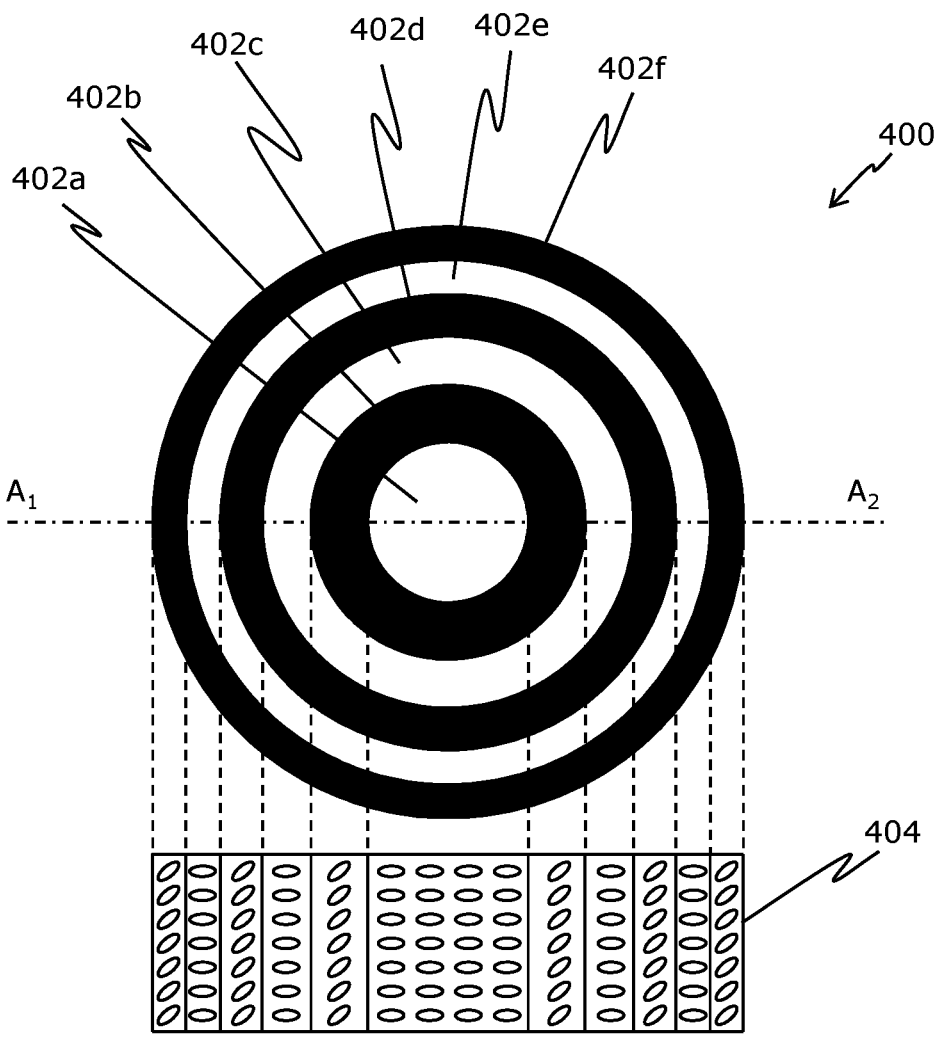
FIG. 4 is a schematic diagram of a liquid crystal Fresnel lens, in accordance with an embodiment of the present disclosure.

Referring next to FIG. 4, illustrated is a schematic diagram of a liquid crystal Fresnel lens 400, in accordance with an embodiment of the present disclosure. The liquid crystal Fresnel lens 400 comprises a plurality of concentric zones 402*a-f* in which a refractive index of a liquid crystal material is to be adjusted differently to emulate characteristics of a Fresnel lens. A cross-section 404 of the liquid crystal Fresnel lens 400 across line A1-A2, shown at a bottom part of FIG. 4, depicts that the refractive index of the liquid crystal material is adjusted by controlling an alignment of liquid crystal molecules in the plurality of concentric zones 402*a-f*.

Figure 5:
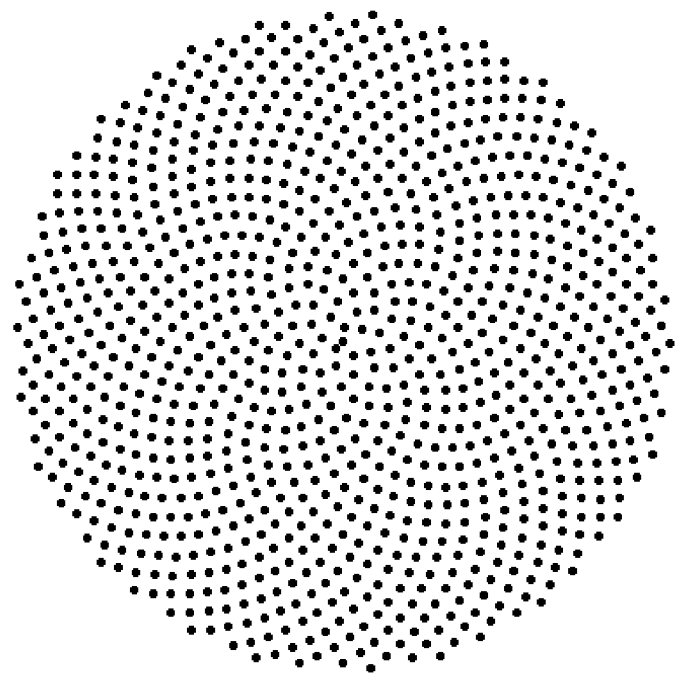
FIG. 5 depicts an example spiral phyllotactic pattern in which a plurality of electrodes can be arranged, in accordance with an embodiment of the present disclosure.

FIG. 5 depicts an example spiral phyllotactic pattern in which a plurality of electrodes can be arranged, in accordance with an embodiment of the present disclosure.

FIGS. 4 and 5 are merely examples, which should not unduly limit the scope of the claims herein. A person skilled in the art will recognize many variations, alternatives, and modifications of embodiments of the present disclosure.

Figure 6:
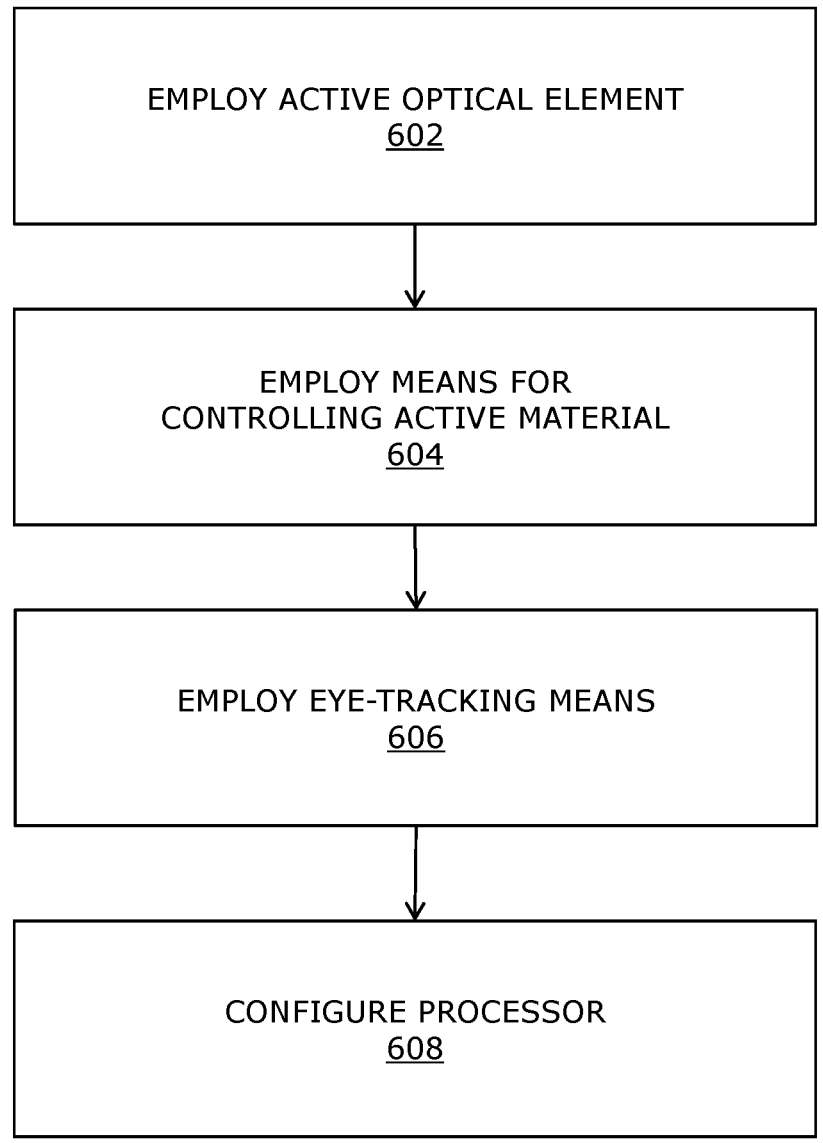
FIG. 6 depicts steps of a method for manufacturing an optical apparatus, in accordance with an embodiment of the present disclosure.

Referring to FIG. 6, illustrated are steps of a method for manufacturing an optical apparatus, in accordance with an embodiment of the present disclosure. At a step 602, an active optical element is formed by encasing an active material between at least a first substrate and a second substrate, the first substrate and the second substrate being optically transparent. At a step 604, means for controlling the active material in the active optical element is employed. At a step 606, eye-tracking means is employed. At a step 608, a processor is configured to perform various operations as per the aforementioned first aspect.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. It will be appreciated that the terms "first", "second", "third" and the like used herein do not denote any order, quantity or importance, but rather are used to distinguish one element from another.

The invention claimed is:

1. An optical apparatus comprising:
   eye-tracking means;
   an active optical element per eye, comprising an active material encased between at least a first substrate and a second substrate, the first substrate and the second substrate being optically transparent;
   means for controlling the active material in the active optical element to generate a plurality of optical powers; and
   a processor configured to:
      process eye-tracking data, collected by the eye-tracking means, to determine gaze directions of a user's eyes;
      detect whether or not the user is looking through a predefined portion of the active optical element, based on a gaze direction of a given eye in front of which said active optical element is worn;
      determine a given optical depth at which the user is looking; and
      when it is detected that the user is looking through the predefined portion of the active optical element, generate a drive signal to drive said means to control the active material in the active optical element to produce a predefined optical power over the entirety of the active optical element based on the predefined portion of the active optical element and the given optical depth at which the user is looking;
      detect when the user's gaze is moving towards a periphery of the predefined portion of the active optical element, based on a change in the gaze direction of the given eye; and
      when it is detected that the user's gaze is moving towards the periphery of the predefined portion of the active optical element, generate at least one other drive signal to drive said means to control the active material in the active optical element to produce at least one intermediate optical power over the entirety of the active optical element, the at least one intermediate optical power lying in a range between a zero optical power and the predefined optical power.

2. The optical apparatus of claim 1, wherein the processor is configured to:
   determine the given optical depth at which the user is looking, based on at least one of:
   the gaze directions of the user's eyes, depth information of a real-world scene currently being seen by the user; and select, from amongst a plurality of predefined optical powers, the predefined optical power for the given eye of the user, based on the given optical depth at which the user is gazing.

3. The optical apparatus of claim 1, wherein the processor is configured to:
   select a portion of the active optical element whose centre overlaps with a pupillary centre of the given eye of the user; and
   identify the selected portion as the predefined portion of the active optical element.

4. The optical apparatus of claim 1, wherein the processor is configured to:
   process the gaze-tracking data to determine a velocity and/or acceleration with which the user's gaze is moving; and
   generate the at least one other drive signal to drive said means to control the active material in the active optical element to produce the at least one intermediate optical power, based on the velocity and/or acceleration with which the user's gaze is moving.

5. The optical apparatus of claim 1, further comprising pose-tracking means, wherein the processor is configured to:
   process pose-tracking data, collected by the pose-tracking means, to determine a velocity and/or acceleration with which the user is moving; and
   generate the at least one other drive signal to drive said means to control the active material in the active optical element to produce the at least one intermediate optical power, based on the velocity and/or acceleration with which the user is moving.

6. The optical apparatus of claim 1, further comprising a passive optical element per eye, arranged on an optical path of the active optical element, the passive optical element having a fixed optical power, wherein the fixed optical power of the passive optical element is combined with a given optical power produced by the active optical element to produce a combined optical power.

7. The optical apparatus of claim 6, wherein the passive optical element is implemented as any one of: the first substrate, the second substrate.

8. The optical apparatus of claim 1, wherein said means is employed to control at least one of: a curvature of a meniscus, a refractive index, an amount of the active material.

9. The optical apparatus of claim 1, wherein said means comprises:
   at least one first electrode deposited on the first substrate and disposed between the first substrate and the active material; and
   at least one second electrode deposited on the second substrate and disposed between the second substrate and the active material,
   wherein the at least one first electrode and the at least one second electrode are optically transparent.

10. The optical apparatus of claim 9, wherein the active material comprises an electrically-conducting liquid and an electrically-insulating liquid, wherein when controlling the active material, a curvature of a meniscus of the active material in the active optical element is controlled to produce a given optical power, the meniscus being a liquid-liquid interface between the electrically-conducting liquid and the electrically-insulating liquid.

11. The optical apparatus of claim 9, wherein the active material is a liquid crystal material, wherein when controlling the active material, an alignment of liquid crystal molecules of the liquid crystal material is controlled to adjust a refractive index of the liquid crystal material in the active optical element, thereby producing a given optical power.

12. The optical apparatus of claim 9, wherein the active material is a fluid whose refractive index matches a refractive index of at least one of: the first substrate, the second substrate, and wherein when controlling the active material, an amount of the fluid in the active optical element is varied, thereby producing a given optical power.

13. A method for manufacturing an optical apparatus, the method comprising:
   employing an active optical element formed by encasing an active material between at least a first substrate and a second substrate, the first substrate and the second substrate being optically transparent;
   employing means for controlling the active material in the active optical element to generate a plurality of optical powers;
   employing eye-tracking means; and
   configuring a processor to:
      process eye-tracking data, collected by the eye-tracking means, to determine gaze directions of a user's eyes;
      detect whether or not the user is looking through a predefined portion of the active optical element, based on a gaze direction of a given eye in front of which said active optical element is worn;
      determine a given optical depth at which the user is looking; and
      when it is detected that the user is looking through the predefined portion of the active optical element, generate a drive signal to drive said means to control the active material in the active optical element to produce a predefined optical power over the entirety of the active optical element based on the predefined portion of the active optical element and the given optical depth at which the user looking;
      detect when the user's gaze is moving towards a periphery of the predefined portion of the active optical element, based on a change in the gaze direction of the given eye; and
      when it is detected that the user's gaze is moving towards the periphery of the predefined portion of the active optical element, generate at least one other drive signal to drive said means to control the active material in the active optical element to produce at least one intermediate optical power over the entirety of the active optical element, the at least one intermediate optical power lying in a range between a zero optical power and the predefined optical power.

14. The method of claim 13, further comprising configuring the processor to:
   determine the given optical depth at which the user is looking, based on at least one of:
   the gaze directions of the user's eyes, depth information of a real-world scene currently being seen by the user; and
   select, from amongst a plurality of predefined optical powers, the predefined optical power for the given eye of the user, based on the given optical depth at which the user is gazing.

15. The method of claim 13, further comprising configuring the processor to:
   select a portion of the active optical element whose centre overlaps with a pupillary centre of the given eye of the user; and
   identify the selected portion as the predefined portion of the active optical element.

16. The method of claim 13, further comprising configuring the processor to:
- process the gaze-tracking data to determine a velocity and/or acceleration with which the user's gaze is moving; and
- generate the at least one other drive signal to drive said means to control the active material in the active optical element to produce the at least one intermediate optical power, based on the velocity and/or acceleration with which the user's gaze is moving.

17. The method of claim 13, further comprising:
employing pose-tracking means; and
configuring the processor to:
- process pose-tracking data, collected by the pose-tracking means, to determine a velocity and/or acceleration with which the user is moving; and
- generate the at least one other drive signal to drive said means to control the active material in the active optical element to produce the at least one intermediate optical power, based on the velocity and/or acceleration with which the user is moving.

18. The method of claim 13, further comprising employing a passive optical element per eye, arranged on an optical path of the active optical element, the passive optical element having a fixed optical power, wherein the fixed optical power of the passive optical element is combined with a given optical power produced by the active optical element to produce a combined optical power.

19. The method of claim 18, wherein the passive optical element is implemented as any one of: the first substrate, the second substrate.

20. The method of claim 13, wherein said means is employed to control at least one of: a curvature of a meniscus, a refractive index, an amount of the active material.

21. The method of claim 13, wherein the active optical element is formed by:
- depositing at least one first electrode on the first substrate; and
- depositing at least one second electrode on the second substrate,
- wherein the at least one first electrode is disposed between the first substrate and the active material, and the at least one second electrode is disposed between the second substrate and the active material, wherein the at least one first electrode and the at least one second electrode are optically transparent.

22. The method of claim 21, wherein the active material comprises an electrically-conducting liquid and an electrically-insulating liquid, wherein when controlling the active material, a curvature of a meniscus of the active material in the active optical element is controlled to produce a given optical power, the meniscus being a liquid-liquid interface between the electrically-conducting liquid and the electrically-insulating liquid.

23. The method of claim 21, wherein the active material is a liquid crystal material, wherein when controlling the active material, an alignment of liquid crystal molecules of the liquid crystal material is controlled to adjust a refractive index of the liquid crystal material in the active optical element, thereby producing a given optical power.

24. The method of claim 21, wherein the active material is a fluid whose refractive index matches a refractive index of at least one of: the first substrate, the second substrate, and wherein when controlling the active material, an amount of the fluid in the active optical element is varied, thereby producing a given optical power.

* * * * *